Patented July 22, 1941

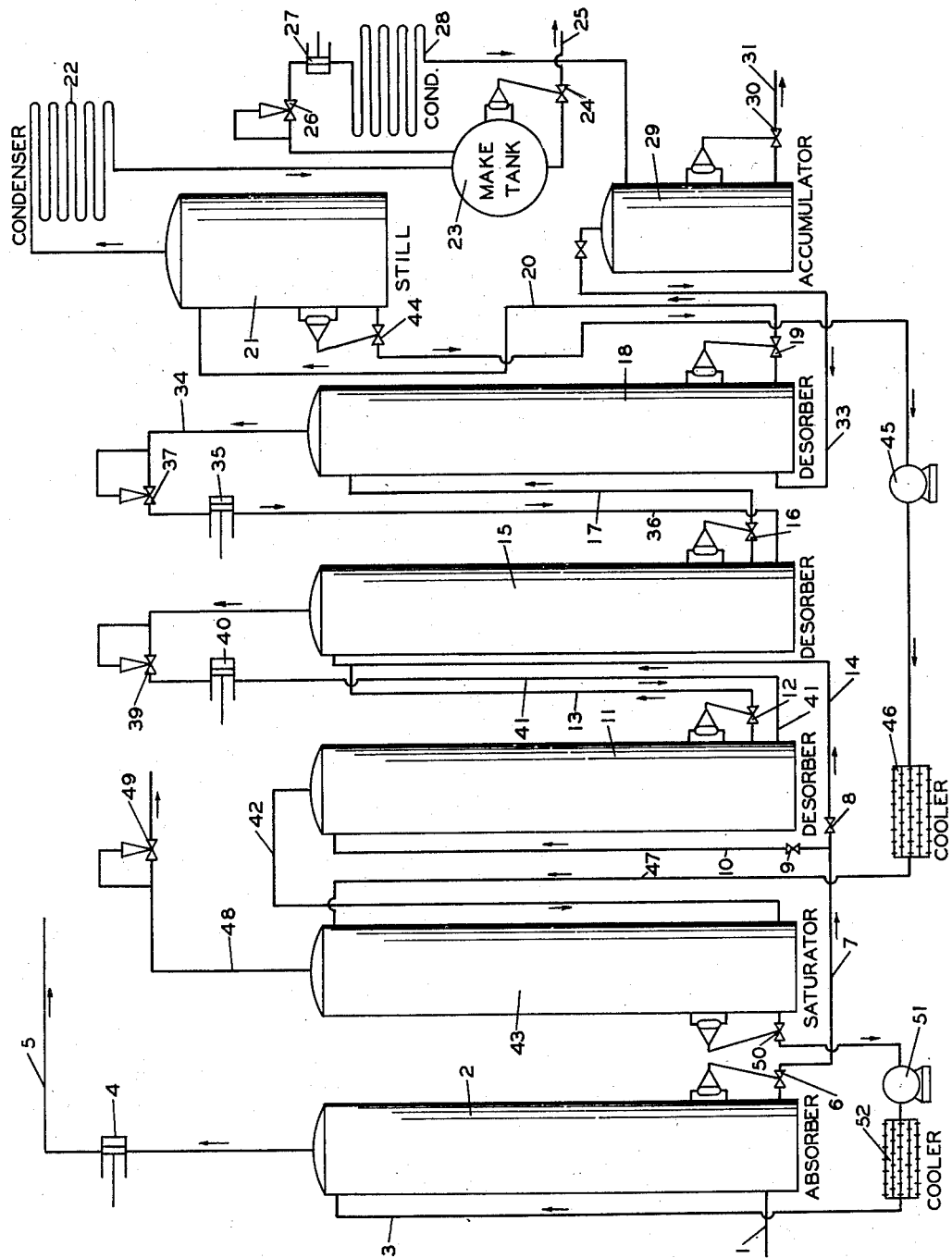

2,249,885

UNITED STATES PATENT OFFICE 2,249,885

PROCESS OF SEPARATING HYDROCARBON GASES AND LIQUIDS

Samuel C. Carney, Bartlesville, Okla., assignor to Phillips Petroleum Company, a corporation of Delaware Application September 28, 1939, Serial No. 296,999

6 Claims. (Cl. 196—8)

This invention relates to a process for separating gases, vapors, and liquids. More specifically, it relates to the recovery of desirable constituents from gases and is particularly adaptable to the recovery of condensate from "condensate" type wells.

In the production of petroleum in recent years, much attention has been given to the recovery of liquid hydrocarbon constituents from the complex fluid mixture produced by the so-called "distillate" or "condensate" type well. This type well produces gas and a light colored hydrocarbon liquid of relatively high A. P. I. gravity at a high gas-liquid ratio. It is generally conceded in the oil industry that the liquid is obtained as the result of the phenomenon of retrograde condensation or the combined effects of retrograde and normal condensation. Retrograde condensation, as the term implies, is the reverse of normal condensation and is manifested by the formation of a condensate upon reduction of pressure at constant temperature. Investigations have shown that in all probability the fluid in the formation from which condensate wells are being produced exists in the gaseous state under relatively high pressures. In many instances, methods of production have decreased the pressure in the producing formation with the result that the reservoir fluid, originally in the gas phase, was partially condensed by retrograde condensation. The liquid formed by condensation wet the reservoir sand and became, to all practical purposes, unrecoverable. Present trends in producing this type of field are to recover as much of the desirable components as possible as a liquid condensate and return the residue gases to the producing formation through input wells by compressors. This operation is known to the industry as "recycling."

Condensate wells are being produced from formations having pressures ranging from 1000 to 3000 pounds per square inch, and it is reasonble to expect that even higher pressures will be encountered as well depths increase. Condensation methods of liquid recovery involve reduction of pressure to the retrograde range. Maximum recovery is obtained in present processes at pressures on the order of 600 to 900 pounds per square inch. Pressure reduction to effect recovery must be accompanied by recompression of the lighter components for recycling to the producing formation. Since the costs of recompression increase rapidly as the process pressure decreases, it is desirable to recover the desirable components at pressures as near the well pressure as possible. For this reason, some of the plants are being operated at pressures in excess of those at which maximum recovery may be obtained.

Conventional oil absorption recovery processes have not been successfully operated at pressures on the order of 2000 to 3000 pounds per square inch, due to retrograde vaporization, which is essentially the converse of retrograde condensation. At such high pressures, solvent oils commonly used partly vaporize into the gas phase at ordinary operating temperatures and are less effective in dissolving desirable components from the gas phase than they are at lower pressures. Laboratory experiments have shown that the relative volatilities of the hydrocarbons, ethane and heavier, decrease with increase in pressure until a pressure of about 800 pounds per square inch is reached and then increase with an increase in pressure up to 3500 pounds per square inch and higher. Relative volatilities have been expressed as the ratio of the molecular concentration in the vapor to the molecular concentration in the liquid under equilibrium conditions and such are known in the art as "Equilibrium constant-$k$." The constant $k$ for methane decreases with an increase in pressure up to 3500 pounds per square inch and higher. Thus both experimentally and by examination of condensates recovered from condensate type wells, it is known that methane and to a lesser extent, ethane, are the only hydrocarbons dissolved in the conventional solvents in increasing amounts with increasing pressure in the pressure range of 800 to 3000 pounds per square inch. By way of example, in applying an absorption process to the recovery of condensate at 3000 pounds per square inch, substantially 50 mol percent of the rich solvent phase will consist of methane and ethane. Propane and heavier may be considered as being dissolved, half by the solvent supplied and half by the methane and ethane in the liquid phase. This is advantageous in that it allows a reduction in the amount of extraneous solvent supplied. The problem present, however, is the separation of the dissolved methane before the heavier dissolved components may be recovered. Recovery of the desirable components is accomplished in this invention by the application of absorption and desorption principles. Some of the advantages of this process are: Removal of methane from the rich solvent at high pressure after leaving the absorber; delivery of about half of the methane back to the high pressure absorber by pumping it as a liquid rather than compressing it as a gas; use of methane in the liquid phase as an auxiliary solvent to reduce the vaporizing tendency of the extraneous solvent in the high pressure absorber, and to reduce its viscosity.

One of the objects of this invention is to provide a process for removal of undesirable gases from a fluid mixture.

A further object of this invention is to provide a process for elimination of methane at high pressures from a mixture of hydrocarbons.

A still further object of this invention is to provide a process for absorption at high pressure and subsequent recovery of desirable components from a hydrocarbon mixture.

Other objects and advantages will be apparent from the detailed description and accompanying drawing forming a part of this specification.

The figure is a diagrammatic view in elevation of apparatus suitable for carrying out my process.

By reference to the drawing, my process is carried out as follows:

The complex hydrocarbon mixture from the producing wells, having been previously cooled to a temperature above that of hydrate formation, and any liquids present separated in a manner known in the art, flows through pipe 1 into absorber 2. Absorber 2 is a contact device in general having from one to twelve plates or preferably the equivalent in packing. Here it is contacted with a composite solvent, as will be later described, being pumped by pump 51 through cooler 52 and enters absorber 2 near its top through pipe 3. Residue gas from the top of absorber 2 flows to compressor 4 from which it is delivered through line 5 and suitable input wells to the producing formation.

The contacting of a high pressure gas mixture with a solvent as thus far described is known in the art, but I use as an example a pressure of 3000 pounds per square inch on absorber 2 and the known art does not extend to a pressure this high. This invention lies in the further steps of preparing the composite solvent and the treatment of the enriched solvent leaving absorber 2.

Enriched solvent is withdrawn from absorber 2 through float controlled valve 6 and line 7. It is divided into two streams by operation of valves 8 and 9. Rich solvent passing valve 9 flows through line 10 into desorber 11. Desorber 11 is operated at a pressure of about 800 pounds per square inch or, more specifically, at or below the pressure at which maximum recovery would be obtained by retrograde condensation. This corresponds to the pressure at which the $k$ constants of the materials to be recovered are at a minimum. Treated solvent from the base of desorber 11 passes through float controlled valve 12 and line 13 into the top of desorber 15 where it joins the stream of rich solvent passing valve 8 in line 14. Desorber 15 is operated at a pressure about ¼ that of desorber 11, for example 200 pounds per square inch. Treated solvent from the base of desorber 15 flows through float controlled valve 16 and line 17 into desorber 18 which operates at a pressure equal to the sum of the partial vapor pressures in the solvent of the components which it is desired to recover. Rich solvent from the base of desorber 18 flows through valve 19 and line 20 to still 21 which is any conventional still or stills for distilling such materials. Vapors from still 21 flow through condenser 22 into make tank 23. Condensate from the make tank passes through float controlled valve 24 and line 25 to storage or further processing, while uncondensed vapors are withdrawn through back pressure valve 26, compressed by recompressor 27, cooled by condenser 28, and delivered to accumulator 29.

The distillation of rich solvent from 18 forms no part of the invention and may be preceded by the known flashing step.

Accumulator 29 is operated at a pressure equal to the vapor pressure of the substantially methane-free product as desired by the operator. Liquid from the accumulator is withdrawn by float controlled valve 30 and passes to further processing or storage through line 31. Uncondensed vapors from the accumulator are delivered by line 33 to the base of desorber 18 and flow upward in countercurrent contact with enriched solvent. Vapors from the top of 18 flow by line 34 to compressor 35, are compressed, and delivered through line 36 to the base of desorber 15. Back pressure regulator 37 controls the pressure in desorber 18. Vapors from the top of 15 flow through back pressure regulator 39 to compressor 40 by which they are compressed and delivered to the base of desorber 11 through line 41. Vapors leaving the top of desorber 11 flow by line 42 to the base of unit 43 which I choose to call a "saturator." Saturator 43 is a contacting device in general supplied at its top with the basic solvent oil, which is withdrawn from still 21 by float controlled valve 44 and is delivered by pump 45 through cooler 46 and line 47. In saturator 43 the basic solvent is saturated with the soluble part of the vapor entering through line 42. Gas undissolved in saturator 43 leaves the top of the saturator through line 48 and back pressure regulator 49. The gas from line 48, chiefly methane, may be compressed and delivered to line 5 for recycling, but usually its volume is such that it will be required for fuel purposes. Composite solvent is withdrawn from the base of saturator 43 through float controlled valve 50 and is pumped by pump 51 through cooler 52 and line 3 into the top of absorber 2, thus completing the cycle.

The division of the rich solvent stream by valves 8 and 9 is so adjusted as to give minimum load on compressor 40. Regulation depends chiefly on the ethane concentration of enriched solvent leaving desorber 11 through line 13. Gas from the downstream desorbers entering the base of desorber 11 through line 41 consists principally of methane and ethane. Upon contact with rich solvent in desorber 11 the ethane is dissolved or partially dissolved, the extent of its solution depending upon the quantity of rich solvent supplied to desorber 11 through line 10. Methane from flashing and from displacement by dissolved ethane leaves desorber 11 through line 42. Proper operation will limit the solvent entering desorber 11 so as to permit a part of the ethane to pass overhead with the methane.

The basis of the invention is the fact that methane, over the pressure range from atmospheric pressure to at least 3500 pounds per square inch gauge, behaves with regard to its solubility in a hydrocarbon mixture in what might be considered a normal manner and as propane, for example, behaves up to a pressure of about 800 pounds per square inch. This process makes use of the solvent power of methane and to a lesser extent of ethane in the liquid phase. The basic solvent chosen is a hydrocarbon liquid of low volatility at the absorber pressure. This basic solvent is treated with the desorbed gas, mainly methane and ethane, in saturator 43 at the pressure defined for the following reasons:

1. At this pressure, approximately 20 mol percent of methane and 10 mol percent or more of ethane will dissolve in the basic solvent, forming the composite solvent fed to absorber 2. The mol percentage of basic solvent fed to absorber 2 will therefore be less than 70 percent instead of 100 percent as is the conventional practice. Since the rate of increase in the value of the equilibrium constant-$k$ with increase in pressure in the retrograde range is less for hydrocarbons of higher molecular weight, reduction of the mol fraction of basic solvent by dilution with methane and ethane will largely, if not entirely, counteract the increase in its equilibrium constant-$k$, or vaporizing tendency. Saturator 34 therefore saturates the basic solvent with methane and ethane for the purpose of reducing its mol fraction in the composite solvent supplied to absorber 2.

2. The gas phase in absorber 2 at 3000 pounds per square inch, for example, is very dense as compared with that of conventional absorption processes operating at lower pressures, e. g. 300 pounds per square inch. Entrainment of solvent in the escaping gas is therefore a more serious matter, and the reduction in viscosity of solvent thus attained is an important aid in reducing entrainment and in reaching equilibrium between the gas phase and the solvent phase in the absorber.

3. When operating absorber 2 at a pressure of 3000 pounds per square inch more than 40 mol percent of the enriched solvent leaving the absorber is dissolved methane. By dissolving substantially half of this methane in the basic solvent at the lower pressure of the saturator, only half as great a volume of methane will have to be used at some pressure lower than the absorber pressure or alternatively compressed to the recycle pressure of line 5. The dissolved methane is pumped in the liquid phase together with the basic solvent to the high pressure of the absorber resulting in a considerable saving in the power required for recompressing the methane for recycling to the formation.

Numerical values of operating pressures appearing from time to time in this specification are approximate and are to be taken as examples. Optimum values for pressures, temperatures, and other variables depend upon the fluid to be processed, the nature of the product desired, and economic considerations. These values may be calculated by methods known to those skilled in the art; actual operating values are determined by the operator. Absorber 2 may be operated at any pressure higher than the pressure maintained in saturator 43 and desorber 11, being operated preferably at a pressure equal to or near the well head pressure of the producing wells for the purpose of minimizing the cost of recompression for recycling.

Having thus described my invention, I claim:

1. A process for recovering desirable constituents from a hydrocarbon complex which comprises contacting the hydrocarbon complex with an absorption oil in an absorption zone at the pressure the hydrocarbon complex comes from the reservoir and above the retrograde condensation range of the desired constituents to be recovered, said absorption oil having been previously saturated at the retrograde point with a mixture of methane and ethane, desorbing from the enriched absorption oil the undesirable dissolved gas by passing the enriched absorbing oil through a plurality of contacting zones in series, the zones being maintained under successively decreasing pressures, and the desorbed gas from each desorbing zone being passed back to the preceding zone so that all desorbed gas leaves the desorbing zones through the initial desorbing zone.

2. A process for recovering desirable constituents from a hydrocarbon complex which comprises contacting the hydrocarbon complex with an absorption oil in an absorption zone at the pressure the hydrocarbon complex comes from the reservoir and above the retrograde condensation range of the desired constituents to be recovered, said absorption oil having been previously saturated at the retrograde point with a mixture of methane and ethane, desorbing from the enriched absorption oil the undesired dissolved gas by passing the enriched absorbing oil through a plurality of contacting zones in series, the zones being maintained under successively decreasing pressures, the desorbed gas from each desorbing zone being passed back to the preceding zone so that all desorbed gas leaves the desorbing zones through the initial desorbing zone, and passing the desorbed gas through the denuded absorption oil at the retrograde point to saturate the absorption oil with methane and ethane.

3. A process for recovering desirable constituents from a hydrocarbon complex which comprises contacting the hydrocarbon complex with an absorption oil in an absorption zone at the pressure the hydrocarbon complex comes from the reservoir and above the retrograde condensation range of the desired constituents to be recovered, said absorption oil having been previously saturated at the retrograde point with a mixture of methane and ethane, desorbing from the enriched absorption oil the undesired dissolved gas by passing the enriched absorbing oil through a plurality of contacting zones in series, the zones being maintained under successively decreasing pressures, the desorbed gas from each desorbing zone being passed back to the preceding zone so that all desorbed gas leaves the desorbing zones through the initial desorbing zone, passing the desorbed gas through the denuded absorption oil at the retrograde point to saturate the absorption oil with methane and ethane and cooling said saturated absorption oil before passing the same into the absorption zone.

4. A process for recovering desirable constituents from a hydrocarbon complex which comprises contacting the hydrocarbon complex with an absorption oil in an absorption zone at the pressure the hydrocarbon complex comes from the reservoir and above the retrograde condensation range of the desired constituents to be recovered, said absorption oil having been previously saturated at the retrograde point with a mixture of methane and ethane, desorbing from the enriched absorption oil the undesired dissolved gas by passing the enriched absorbing oil through a plurality of contacting zones in series, the zones being maintained under successively decreasing pressures, the desorbed gas from each desorbing zone being passed back to the preceding zone so that all desorbed gas leaves the desorbing zones through the initial desorbing zone, distilling the desired hydrocarbon products from the absorption oil, passing the desorbed gas through the denuded absorption oil at the retrograde point to saturate the absorption oil with methane and ethane and cooling said saturated absorption oil before passing the same into the absorption zone.

5. A process for recovering desirable constituents from a hydrocarbon complex which comprises contacting the hydrocarbon complex with an absorption oil in an absorption zone at the pressure the hydrocarbon complex comes from the reservoir, and above the retrograde condensation range of the desired constituents to be recovered, said absorption oil having been previously saturated at the retrograde point with a mixture of methane and ethane, desorbing from the enriched absorption oil the undesirable dissolved gas by passing the enriched absorbing oil through a plurality of contacting zones in series, the zones being maintained and operated at the retrograde condensation range, 200 pounds and the sum of the partial pressures of the desired product successively, and the desorbed gas from each desorbing zone being passed back to the preceding zone so that all desorbed gas leaves the desorbing zones through the initial desorbing zone.

6. A process for recovering desirable constituents from a hydrocarbon complex which comprises contacting the hydrocarbon complex with an absorption oil in an absorption zone at the pressure the hydrocarbon complex comes from the reservoir and above the retrograde condensation range of the desired constituents to be recovered, said absorption oil having been previously saturated at the retrograde point with a mixture of methane and ethane, desorbing from the enriched absorption oil the undesirable dissolved gas by passing the enriched absorbing oil through a plurality of contacting zones in series, the zones being maintained under successively decreasing pressures, the desorbed gas from each desorbing zone being passed back to the preceding zone so that all desorbed gas leaves the desorbing zones through the initial desorbing zone, removing the undesired gas from the top of the absorption zone, recompressing this gas and entering the same back into the producing formation.

SAMUEL C. CARNEY.